Jan. 15, 1957  L. A. BLISS ET AL  2,777,295
CONCRETE RESERVOIR FOR LIQUEFIED GASES
Filed Sept. 12, 1952  2 Sheets-Sheet 1

INVENTORS
LYMAN A. BLISS
PETER M. RIEDE
JOHN H. BECKMAN
BY
D. C. Harrison
ATTORNEY

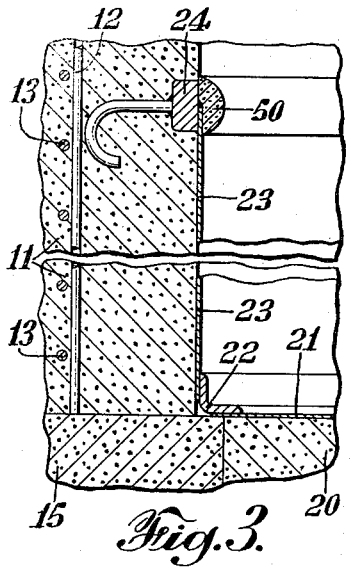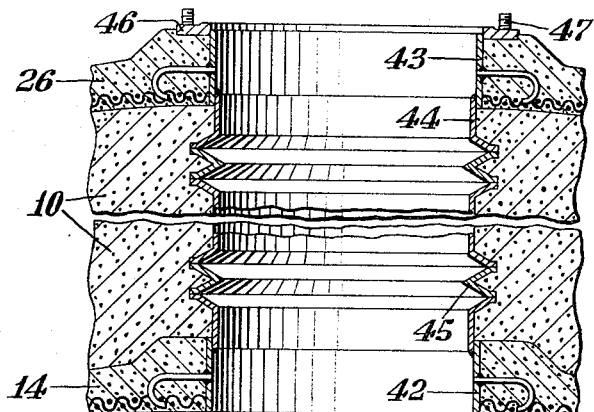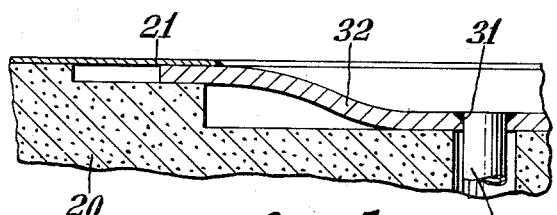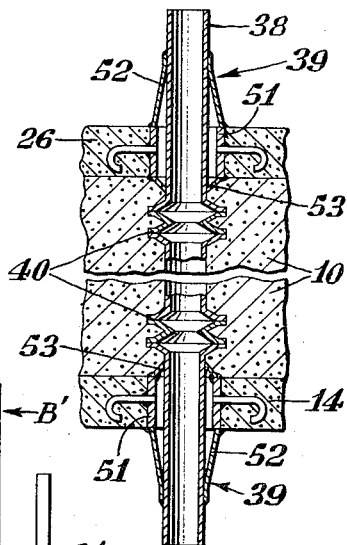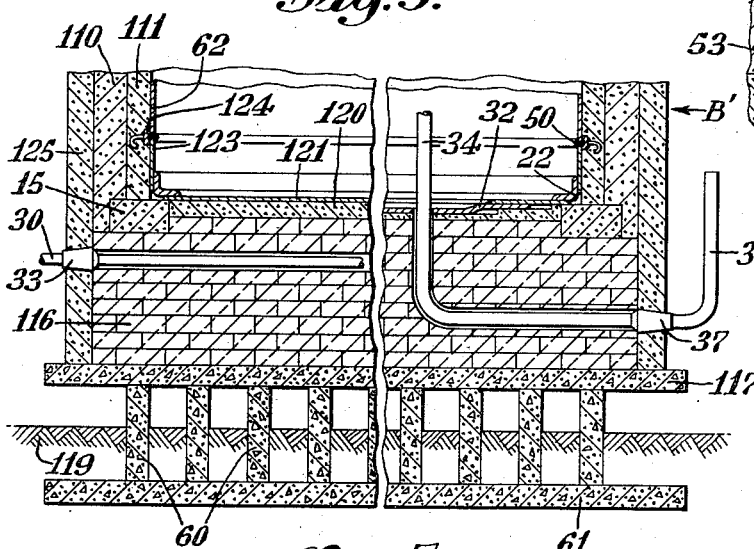

United States Patent Office 2,777,295
Patented Jan. 15, 1957

2,777,295
CONCRETE RESERVOIR FOR LIQUEFIED GASES

Lyman A. Bliss, New York, and Peter M. Riede and John H. Beckman, Kenmore, N. Y., assignors to Union Carbide and Carbon Corporation, a corporation of New York Application September 12, 1952, Serial No. 309,306

9 Claims. (Cl. 62—1)

This invention relates to improvements in double-walled insulated storage tanks for liquefied gases to be preserved at low temperatures and, more particularly, to such tanks in which the inner vessel and outer shell are made of reinforced concrete or prestressed reinforced concrete and so constructed that liquefied gases such as liquid oxygen, nitrogen, or other gases having boiling points below 275° K. or 230° K. or at least below 185° K. may be safely stored with relatively small losses due to evaporation.

Double-walled insulated tanks for preserving liquefied gases having low atmospheric boiling point temperatures have been constructed with metal inner vessels surrounded by metal outer shells and having insulating material in the space between the inner vessel and outer shell. It was necessary to make the inner vessel of special metals that are not embrittled at the low temperatures, such as stainless steel or nonferrous alloys, and of a thickness to resist the forces of hydraulic pressure and the maximum internal pressure under which the liquefied gas may be stored if storage is at moderate pressures above atmospheric. The inner vessel must also be stiff enough to withstand external pressures of a free-flowing powder insulation when the tank is empty. The outer shell must also be strong enough to support a free-flowing powder insulation, to be gastight so as to exclude the external atmosphere and prevent atmospheric moisture from entering the insulation, and preferably to sustain a small internal gas pressure. Provision also must be made to prevent the difficulties caused by freezing of the ground on which the outer shell is supported due to leakage of heat from the ground toward the bottom of the inner vessel. All of these considerations cause the construction of a container or tank made with metal walls, especially in large sizes, to be too expensive to be economical for many uses. One such container is described in the U. S. Patent No. 2,520,883 of H. C. Kornemann and G. W. Patch.

A principal object of the present invention is to provide a double-walled insulated tank construction for safely preserving liquefied gases at temperatures below 275° K. or 230° K. which can be provided at a lower cost than former constructions.

A further object is to provide such a container which employs inner vessel and outer shell supporting walls of reinforced concrete, preferably of the prestressed type.

These and other objects and advantages of this invention will become apparent from the following description and the accompanying drawings in which:

Fig. 3 is an enlarged fragmentary detail sectional view of the lower left corner of the inner vessel of Fig. 1 showing the mode of securing the bottom liner;

Fig. 4 is an enlarged detail view of a section through the upper manhole in Fig. 1;

Fig. 5 is an enlarged fragmentary detail sectional view of a reinforcement plate at the bottom outlet connections of the inner vessel;

Fig. 6 is an enlarged detail view of a section through a vent pipe passing through the walls of the inner vessel and outer shell; and Fig. 7 is a view of a vertical cross-section of the lower part of an alternative construction of a container according to the present invention.

Figure 1:
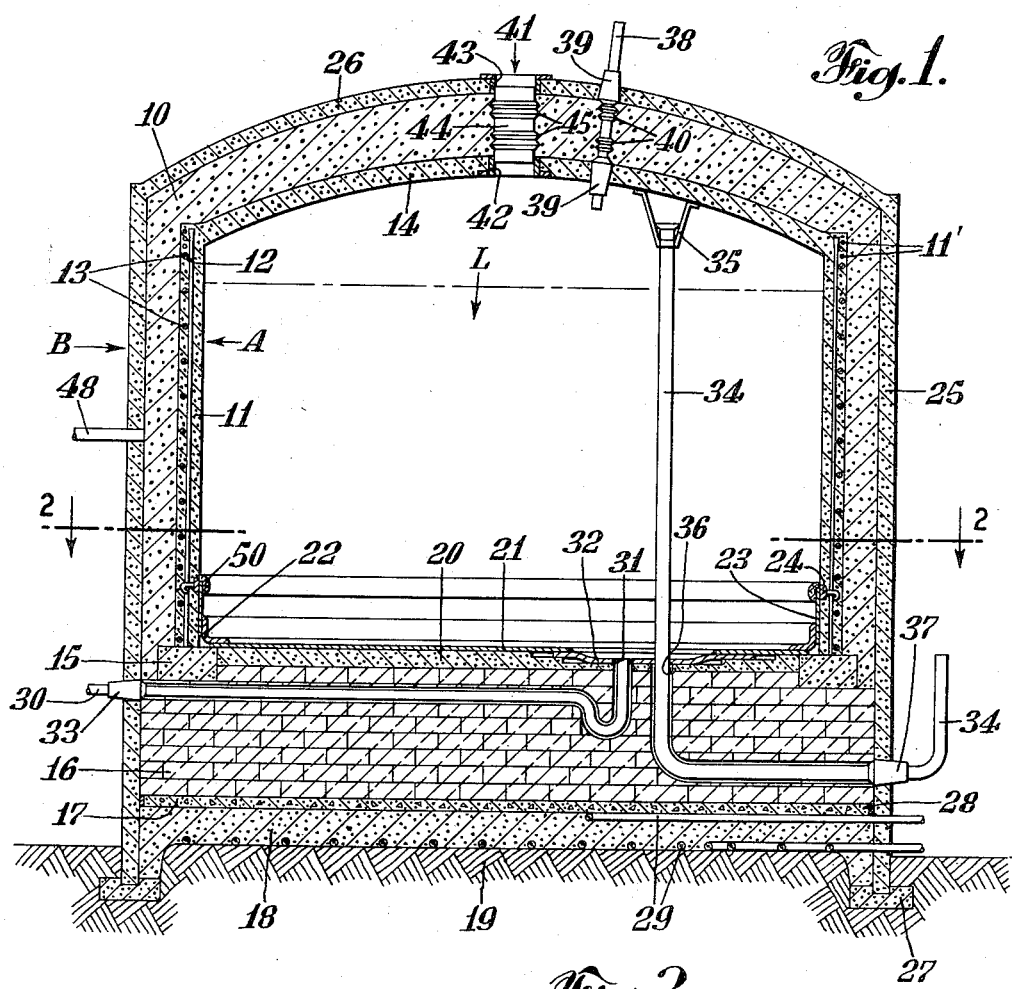
Fig. 1 is a view mainly in vertical cross-section of an exemplary construction of a container according to the present invention.

It has been discovered that the properties of concrete cured at ordinary temperature are not so impaired when subject to extremely low temperature such as by contact with liquid oxygen or nitrogen, that the material cannot safely be used to form tank walls for holding such liquids. Actually, the compressive strength and modulus of elasticity are found to increase substantially when subject to liquid oxygen temperature. It is well known that structural and other carbon steels become embrittled when subject to such low temperatures, but it has also been discovered that it is not necessary to use stainless steel or high-strength nonferrous materials for reinforcement, but that hard-drawn wires of carbon steel or thin bands of carbon steel having axially elongated grain structure, when used as reinforcement in the concrete, are not adversely embrittled when the reinforced concrete, and particularly prestressed reinforced concrete, is subject to the low temperature of the liquefied gas.

Among the wires that are found useful for prestressed reinforcement of at least the side walls of the inner vessel are preferably those wires having ultimate tensile strengths over 100,000 lbs. per square inch and less than 1/4 inch diameter and may include: cold-drawn carbon steel wire, piano wire, music wire, oil-tempered steel wire with a corrosion-resisting coating such as galvanizing, a "hard-drawn lead patented" wire. The following table gives results of tests of certain exemplary wires found usable:

| Material | Tensile, p. s. i. at temperature of— | | Impact Value, ft. lbs. at temperature of— | |
| --- | --- | --- | --- | --- |
| | Room | Liquid Nitrogen | Room | Liquid Nitrogen |
| A cold-drawn carbon steel | 230,000 | 301,000 | 23 | 24 |
| Oil-tempered steel | 221,000 | 274,000 | 26 | 20 |
| Hard-drawn lead patented | 208,000 | 292,000 | 24 | 25 |
| Piano | 258,000 | 329,000 | | |
| 303 Stainless steel | 116,000 | 160,000 | 36 | 41 |

Concrete is weak in tension, but is strong under compressive forces. The thermal stresses occurring on the inner face of the concrete walls of an inner vessel while it is cooling from room temperature to liquid oxygen temperatures would be tensile in nature and would tend to rupture the liquid vessel walls. While the walls are being cooled by the liquid there is a temperature gradient horizontally through the wall. Since the inner surface is colder, it has contracted more than the outer portion. It is, therefore, tending to go into tension, since its contraction is being restricted by the relatively warmer outer portion of the wall. After cooling is complete and the temperature gradient through the wall is essentially zero, the interaction no longer exists, since there is no differential in amount of contraction caused by temperature change. It is found that such rupturing forces can be avoided by prestressing the inner layers of the concrete vessel wall by wrapping the walls with bands or wires under high stress. The discovery that carbon steel wire or thin bands of carbon steel could be used for such prestressing when subject to very low temperature was unexpected and surprising, since all prior knowledge indicated that carbon steel became too brittle at low temperatures to permit its use under high stress.

While the floor of the inner vessel could also be made of prestressed concrete, it is found that when the vessel diameter is large the forces of expansion and contraction becomes too great to control, and therefore the floor cannot conveniently be made of concrete that will remain liquidtight. The floor is therefore covered with a thin sheet of metal, preferably of stainless steel, "Everdur" or other material having satisfactory low-temperature strength and ductility. It is necessary to secure such a floor to the vertical side walls in a liquidtight manner, and according to the invention this is accomplished by providing the floor with an upstanding peripheral flange, the upper edge of which is secured to the concrete wall. The sheet-metal flooring may be cupped up at its edges or the upstanding flange may be secured to an annular corner angle which is welded to the floor sheet. In either case the flange allows the floor to shrink with a minimum of stress in the following manner: The first liquefied gas that is poured into the vessel will cool the floor approximately uniformly if such floor is flat, and the lower edge of the flange will quickly arrive at the liquefied-gas temperature. The upper edge of the flange will remain close to the temperature of the wall, so that there will exist a temperature gradient in the flange which will cause the flange diameter to change uniformly and without concentrated circumferential stress. There will merely be a slight bending in the flange.

The upper edge of the flange may be secured by providing a rim thereon which may be imbedded in the concrete of the wall. Preferably, the upper edge of the flange is welded to a ring of carbon steel which is imbedded in and bonded to the concrete of the side wall. The metal of the ring or bar should be a metal which has a coefficient of expansion substantially the same as that of the concrete and which is of a character that readily bonds with the concrete. It is found that the carbon steel has such properties and, further, that the carbon steel when imbedded in the concrete and of sufficient massiveness will not be subject to any sever stresses or is so supported by the concrete that embrittlement due to cooling to liquefied-gas temperature causes no difficulty. Therefore, the upper edge of the flange can be welded to the carbon steel ring and provide a liquidtight seal.

For a container holding liquefied gas, an outer shell for holding and protecting a layer of insulation is required. This shell could be made of sheet steel, because it is subject to ordinary atmospheric temperatures. It is found preferable, however, that the outer shell, or at least the vertical side walls thereof, may also be made of reinforced concrete or preferably of prestressed reinforced concrete similar to the vertical wall of the inner vessel. In this manner, if the inner vessel should leak and allow cold liquefied gas to enter the insulation space, the outer shell, even though it is subjected to liquefied-gas temperature, can safely retain the liquid without damage.

For the operation of a liquefied gas storage container, inlet and outlet conduits for liquid and gas are required, and these must pass from the interior of the inner vessel through the walls of the inner vessel and outer shell. It is therefore necessary to provide means for sealing the point of passage of such conduits through the concrete walls. For this purpose a carbon steel sleeve is anchored and bonded with the concrete wall at the points of passage of the conduits through such wall. Such sleeves provide a sealing bond with the concrete and also a reinforcement for the opening through the concrete wall. The conduits pass through such sleeves, and the seal is made by welding a thin sheet-metal annulus of a shape providing a required amount of flexibility to both the carbon steel sleeve and the conduit passing therethrough.

Figure 2:
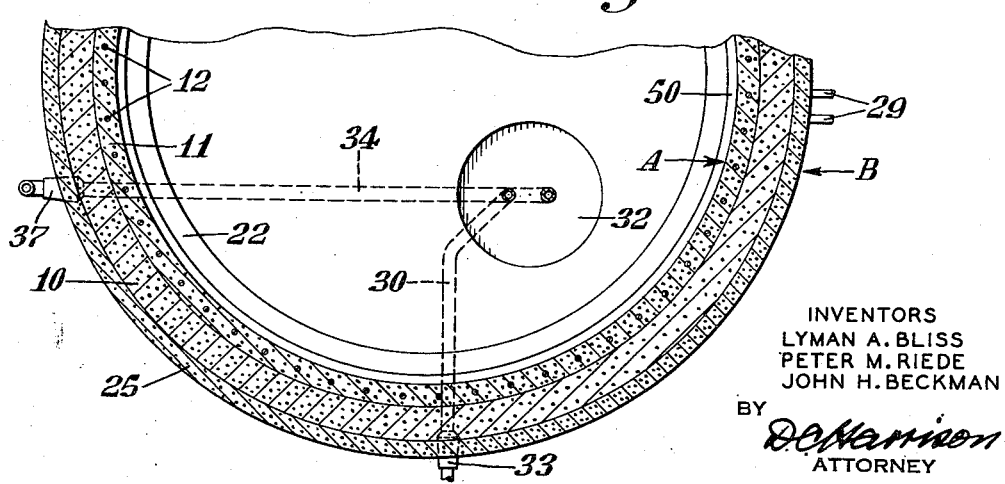
Fig. 2 is a fragmentary view of a horizontal cross-section taken on the line 2—2 of Fig. 1.

Referring now to the drawing, and particularly Figs. 1 and 2, a container for liquefied gas according to the invention may comprise an inner vessel A holding a body of liquefied gas L and surrounded by an outer shell B with an insulation space 10 therebetween. The space 10 is preferably filled with a powder or fibrous insulation material having high insulation efficiency. The inner vessel vertical side walls 11 are preferably made of prestressed reinforced concrete in which the concrete is prestressed when at atmospheric temperature by vertical prestressing wires 12 and by a wrapping of annular prestressing wires indicated at 13. The prestressing wires when the vessel is at room temperature are preferably under a tension of about 140,000 p. s. i. When such a wall is being cooled to the temperature of the liquefied gas, for example, the temperature of liquid oxygen, the shrinkage of the concrete will be such that a large portion or all of the compressive stress in the inner layers of the vertical walls may be relieved. The high-tensile-strength wires employed, however, have elasticity, so that they continue to provide support.

The inner vessel is preferably provided with a roof 14, which could be a suspended flat roof, but preferably may be dome-shaped and also formed of reinforced concrete or prestressed reinforced concrete. For example, the dome 14 may be reinforced with a layer of wire mesh 14' positioned near the lower surface of the dome and not shown in Fig. 1 but indicated in Fig. 4, and the dome may be prestressed by a circumferential winding of closely spaced prestressing wire 11' or by a thin band of metal around the portion of the wall A where the dome joins the wall and which maintains the dome in a state of compression.

The lower edges of the walls 11 may be supported by a footing ring 15 that can be made of reinforced concrete or the like and which is preferably supported upon a layer of heat-insulating material having sufficient compressive strength in addition to high heat-insulation effectiveness. A preferred form of insulating layer 16 is built up of blocks of heat-insulating material such as "Foamglas." Such layer 16 may be supported on the ground in any suitable manner, and preferably in Figs. 1 and 2 it is supported upon a concrete slab 17 which rests upon a layer of compacted sand 18 directly upon firm earth 19. The floor of the inner vessel A preferably comprises a layer of lightweight concrete which, for example, may be a concrete made up with a lightweight aggregate such as perlite and also contains entrained air. Such concrete layer 20 has heat-insulating value and forms a smooth support for a thin sheet-metal floor liner 21, the thickness of which is exaggerated in the drawing for the purpose of illustration. The liner 21 is secured at its outer periphery to a corner angle 22, preferably made of stainless steel if the floor liner 21 is made of such metal. Also welded to the corner angle 22 is an upstanding flange 23 of similar sheet metal which has its upper edge welded to an annular carbon steel bar 24 which is imbedded in the inner surface of the vertical wall 11 and bonded and anchored thereto. The joint between the flange 23 and bar 24 is also preferably covered with a band of pneumatic mortar 50. This is applied mainly for mechanical protection of the joint and any exposed parts of the bar 24.

The outer shell B of the container may have outer walls 25 of reinforced concrete or prestressed reinforced concrete and a dome-shaped roof 26. The walls 25 are carried down around the insulation layer 16 to foundation footings 27 within the ground, preferably below the frost line. The slab 17 is preferably sealed to the walls 25 in a manner providing slight relative movement therebetween. Such seal could be a sheet-metal web secured at its edges to the slab and the walls 25 or, as shown in the drawing, may be a flexible sealing compound 28. This is desired to prevent ground moisture working its way up into the insulating layer 16. After a considerable period of time heat that flows at a slow rate from the ground 19 toward the liquid body L may cause the ground to become chilled enough to freeze moisture therein, and this may cause heaving of the ground, which is undesirable. To prevent this, there may be provided a means for supplying heat to the surface of the ground, preferably by a heating conduit 29, which is distributed and retained within the sand layer 18. The conduit 29 may conduct a heating fluid or it may contain electrical heating elements.

For removal of liquid from the container, there is preferably provided at least one liquid drain conduit 30, which is secured at its inner end 31 to a reinforcing plate 32 of thicker metal than the floor liner 21, and which is provided so that the area of the insulating layer 16 immediately surrounding the liquid conduit 30 may have openings through which the conduit 30 and other conduits may pass. The conduit 30 passes through the insulating layer 16 and through the wall 25 of the outer shell, being sealed at 33 by means hereinafter described.

There is also provided an overflow conduit 34 which has its upper open end at or just above the highest desired liquid level and which is braced by a bracket 35 secured to the roof dome 14. The conduit 34 is gastightly secured in a hole 36 through the reinforcing plate 32, and the conduit 34 then passes through the insulating layer 16 and horizontally through the wall 25, the passage being sealed by a sealing means 37 hereinafter described.

A vapor outlet conduit 38 may also be provided, and this may pass through the walls of the inner vessel and outer shell. For example, the conduit 38 may pass through the roofs 14 and 26, being sealed at each such passage by sealing means 39 and having in the intermediate portion expansion joints 40 of corrugated metal.

For a large-sized container it is also desirable to provide a manhole for access to the interior of the inner vessel. Such manhole 41 is shown on an enlarged scale in the detail view of Fig. 4 and may comprise a carbon steel ring 42 which is anchored in and bonded to an opening in the roof 14. A similar sleevelike ring 43 is anchored in and bonded to a hole in the roof 26 in alignment with the sleeve 42. These sleeves are connected by a tube 44, which has annular corrugated portions 45 to provide for limited relative movement between the sleeves 42 and 43. The ends of the tube 44 are gastightly welded to the upper and lower portions respectively of the sleeves 42 and 43, and the upper end of the sleeve 43 may be welded to a ring 46 having studs 47 by which a cover plate may be secured. The walls of the shell B may also have an inlet connection 48 through which a dry gas may be supplied to keep the insulation under a slight superatmospheric pressure. Such connection may also communicate with a device not shown for relief of excess gas pressure in the event that such pressure may accidentally develop.

The construction of the seals 39 for the vapor pipe 38 are similar to the construction of the seals 33 and 37; therefore, the seals 39 only are described in detail. These are shown more clearly in Fig. 6. The lower seal 39 comprises a carbon steel ring 51 of substantial thickness which is anchored to and bonded to the concrete of a hole in the roof 14. Such ring 51 extends through the roof and has its ends exposed. The lower exposed end of the ring 51 is welded gastightly to the large end of a sheet-metal conical frustum 52 that surrounds the pipe 38 and has its smaller end welded to the pipe at a distance from the ring 51. At the other end of the ring 51 there is welded a sheet-metal guide ring 53 which may be flat or of frustoconic form, as shown. The ring 53 is short and stiff, and its smaller opening is not welded to the pipe 38, but merely provides a guiding and centering means for the pipe. The carbon steel sleeve 51 provides an anchorage and seal by retaining a bond with the concrete. It also provides reinforcement for the opening through the concrete. The thin sheet metal, preferably stainless steel, cone 52 hermetically seals the opening to prevent passage of vapor, or when used for the wall of the shell to prevent influx of moisture-laden air; while at the same time permitting a very restricted heat flow path due to the combination of low conductivity of stainless steel, the length of the cone, its thinness, and its small average circumference due to the conical shape. The conical shape also provides great resistance to axial forces. The inside guide 53 provides resistance to lateral forces. Therefore, its short end has a steep angle. The heat flow through the guide 53 is restricted because it is not welded to the conduit 38, but merely touches it at very narrow areas. The forces are caused by the changes of temperature when cold material flows through the conduit 38, and the anchorages force the relative movements to be confined to the expansion joints 40.

The corresponding seal 39 for the passage of conduit 38 through the dome 26 is of similar construction, but is oppositely oriented. Instead of expansion joints 40, the conduits may have expansion bends formed therein. Thus the conduit 30 has an expansion bend formed therein, and its seal 33 may be similar to the seal 39. The seal 37 for the conduit 34 can also be of similar construction. Alternatively, for a conduit that has no expansion bend or expansion joint, the seal can be formed by attaching a ring similar to the ring 51 a bellows, one end of which is welded or soldered to the ring and the other end of which is gastightly secured to the conduit. Such a bellows would provide free axial and angular movement of the conduit while hermetically sealing the opening and permitting a minimum of thermal conduction.

Referring now to Fig. 7, there is illustrated an alternative form of construction differing mainly in the support for the container on the earth. Such support comprises a floor slab 117 of reinforced concrete large enough to carry the outer shell B'. The slab 117 is supported above the surface of the ground 119 by a plurality of piers 60 which extend through the ground to a foundation footing 61 located substantially below normal frost level on firm ground. The piers allow space for the circulation of atmospheric air, so that the piers are maintained substantially at the same temperature as the air and therefore no abnormal amount of heat will be taken from the ground.

In this embodiment of the invention insulating layer 116 may be supported directly on the slab 117 and the wall 125 of the shell extends only to the slab 117 on which it is supported. The walls 125 and 111 of the shell and the inner vessel may be made of reinforced concrete. Preferably, when the inner wall 111 is made of nonprestressed reinforced concrete the lining 62 may be carried upward to the top of the wall as an extension of the flange 123. Preferably, the flange 123 and the floor lining 121 may be similar to the flange and floor lining of Fig. 1. Such flange 123 is secured to the horizontal annular bar 124 by welding, and the lower edge of the liner 62 is secured also the bar 124 by welding. The upper edge of the lining 62 may be secured to the upper part of the wall 111 by a similar construction employing another annular bar imbedded in the concrete of the wall.

When the walls of an inner vessel are unlined, as in Fig. 1, the concrete employed is of the dense, impervious type; however, an inorganic sealing coating may be applied to the inner surface.

An example of a suitable concrete mix for the inner vessel walls may be made with a cement having the properties of American Society for Testing Materials type I cement having 2¾ inch slump test and may employ per cubic yard 8 bags of cement, 1250 lbs. of sand, 1785 lbs. of gravel of about 1¼ inch maximum size and include about 4% air entrainment agent. It was found that such a concrete at 58 days age had a compressive strength of over 6,999 lbs. per square inch at room temperature and over 11,000 lbs. per square inch at the temperature of liquid nitrogen (77.4° K.). The modulus of rupture at room temperature in lbs. per square inch was 518 and at liquid nitrogen 882. It was also found that the average coefficient of thermal expansion was $4.7 \times 10^{-6}$ inch per inch per degree F.

The terms "reinforced concrete" and "prestressed reinforced concrete" are not synonymous; the former term includes and is now commonly thought of as referring to ordinary reinforcement of concrete with metal wires and bars while the latter term specifically applies to concrete structures in which the concrete is prestressed by imbedded wires placed and maintained in tension. With ordinary reinforced concrete the lack of tensile strength is compensated for by imbedding steel bars in the mortar in the portions of the concrete which must resist tensile loads. The steel, therefore, takes the tensile load applied to those areas of the structure. In the case of prestressed concrete advantage is taken of the relatively high allowable compressive stress of concrete by stressing the parts of the concrete which would normally be subjected to tensile loads to initial compressive loads which are in excess of any expected tensile load. Prestressed concrete is, therefore, not allowed to be stressed in (net) tension whereas ordinary reinforced concrete is.

In the claims the term "reinforced concrete" is employed in the generic sense to include ordinary reinforcement as well as the specific variety of reinforcement that prestresses the concrete, and the term "prestressed reinforced concrete" is employed to include only the reinforcement system that prestresses the concrete.

While the invention has been described in connection with specific embodiments of containers especially suitable for the storage of liquid oxygen or nitrogen, it is contemplated that the invention may be used for storage of other liquefied gases such as natural gas, methane, or the like, and it is intended to cover all changes and modifications of the structures herein described for purposes of illustration which fall within the spirit and scope of the invention.

We claim:

1. In a double-walled storage container for liquefied gases having a temperature below 275° K. including an inner vessel and an outer shell spaced from and surrounding said inner vessel with the intervening space between said inner vessel and outer shell containing heat insulating material, the combination comprising a body of said liquefied gas within said inner vessel; inner vessel substantially vertical side walls formed of prestressed reinforced concrete; drawn metal tension members having axially elongated grain structure, improved strength, and non-brittle characteristics at the temperature of said liquefied gas encircling said side walls, and said side walls being prestressed by said tension members to a degree such that said side walls are maintained in a state of compression at least when said inner vessel is less than substantially filled by said body of liquid; and a coating of an inorganic surface sealer on at least a major portion of the inner wall surface of said inner vessel side walls, said coating being in contact with the liquefied gas.

2. In a double-walled storage container for liquefied gases at low temperatures the combination comprising inner vessel substantially vertical side walls of prestressed reinforced concrete; a horizontal relatively thick flooring comprising heat-insulating material having substantial compressive strength, the vertical side wall being supported upon the peripheral portions of said flooring; a sheet-metal floor liner supported by the flooring, said floor liner having an upwardly extending sheet-metal peripheral flange adjacent said side wall; a horizontal continuous carbon steel bar imbedded and secured in the inner surface of said concrete side wall, said bar being a short distance of at least 6 inches above said sheet-metal floor liner; and the upper edge of said peripheral flange being secured gastightly to said bar by welding.

3. A liquefied gas storage container according to claim 2 in which at least the sheet-metal peripheral flange is of a metal having high impact value at very low temperature selected from the group consisting of austenitic steels, copper, copper alloys, aluminum, aluminum alloys.

4. A liquefied gas storage container according to claim 2 which includes a sheet-metal lining on the wall of said inner vessel above said peripheral flange of the floor lining and welded gastightly to said flange.

5. In a large double-walled storage container for liquefied gases the combination comprising an inner vessel with walls including at least side and top walls formed of prestressed reinforced concrete; a conduit for gas material passing through an opening in at least one of said walls, said opening being of larger diameter than said conduit; and means for sealing said opening comprising a carbon steel liner ring imbedded in the wall of said opening and anchored in the concrete of the wall, the ends of the ring being adjacent the wall surfaces, a spacer ring having inner and outer rims and having its outer rim secured to the inner end of said ring and its inner rim in contact with said conduit, and a sheet-metal conical frustum having its base gastightly welded to the outer end of the ring and its smaller end gastightly secured to said conduit.

6. A liquefied gas container according to claim 5 in which said sheet-metal conical frustum is made of stainless steel.

7. In a large double-walled storage container for liquefied gases the combination comprising an inner vessel with walls including at least side and top walls formed of prestressed reinforced concrete; a conduit for gas material passing through an opening in at least one of said walls, said opening being of larger diameter than said conduit; and means for sealing said opening comprising a carbon steel liner ring imbedded in the wall of said opening and anchored in the concrete of the wall, the ends of the ring being adjacent the wall surfaces, a spacer ring having inner and outer rims and having its outer rim secured to the inner end of said ring and its inner rim in contact with said conduit, and a corrugated metal bellows having one end gastightly secured to the outer end of said ring, its other end gastightly secured to an end closure ring which is secured gastightly to said conduit.

8. In a large double-walled storage container for liquefied gases the combination comprising an inner vessel for holding the liquefied gas at low temperature; an outer shell surrounding the inner vessel at a spacing to provide an insulation space therebetween, said inner vessel and said outer shell having cylindrical substantiallly vertical side walls and covers formed of reinforced concrete; and a manhole providing access to the interior of the inner vessel comprising a lower carbon steel liner ring imbedded and anchored in an opening in the cover of said inner vessel, an upper metal liner ring imbedded and anchored in an opening in the cover of said outer shell above the opening in the cover of the inner vessel, and sheet-metal tube having its lower edge gastightly welded to said lower carbon steel liner ring and its upper edge gastightly secured to said upper liner ring, said tube intermediate its end portions including an annularly corrugated portion.

9. A large double-walled storage container for holding a body of liquefied gas at temperatures below 185° K. comprising an outer shell having a substantially vertical cylindrical wall formed of reinforced concrete supported on an annular footing below the level of ground within said wall; a layer of compacted sand on the ground within said wall; a floor slab supported on the sand layer formed of concrete and having its edges close to the inner surface of said shell wall; a flexible sealing means between the edge of said floor slab and said shell wall; a layer of inorganic insulation blocks on said floor slab; an inner vessel having a substantially vertical cylindrical wall formed of reinforced prestressed concrete supported by an annular footing on the layer of insulation blocks, said inner vessel wall being smaller than said shell wall to provide an insulation space therebetween; a layer of lightweight cementitious material on said insulation blocks within said inner vessel wall; a sheet-metal liner supported upon said layer of lightweight cementitious material and having an upstanding sheet-metal peripheral flange adjacent the inner vessel wall; a horizontal continuous carbon steel ring imbedded in the inner surface of the inner vessel wall and anchored therein; weld means securing the upper edge of said peripheral flange to said carbon steel ring; a fluid conduit having its inner portion end secured gastightly in an opening in said sheet-metal liner, said conduit extending downwardly through a hole in the layer of light weight cementitious material on the insulation blocks and then through a hole in the outer shell wall; and means for sealing said hole about the conduit.

References Cited in the file of this patent
UNITED STATES PATENTS

| | | |
|---|---|---|
| 146,723 | Tiffany | Jan. 20, 1874 |
| 2,315,894 | Crom | Apr. 6, 1943 |
| 2,329,719 | Hewett | Sept. 21, 1943 |
| 2,332,227 | Jackson | Oct. 19, 1943 |
| 2,386,958 | Jackson | Oct. 16, 1945 |
| 2,396,459 | Dana | Mar. 12, 1946 |
| 2,417,190 | Crom | Mar. 11, 1947 |
| 2,684,173 | Schmitz | July 20, 1954 |